Sept. 4, 1962 S. SCHWARTZ Re. 25,234

PACKING MEANS FOR PILE FABRICS

Original Filed June 1, 1956 3 Sheets-Sheet 1

INVENTOR.
SOL SCHWARTZ
BY Zoltan A. Polachek
ATTORNEY

Sept. 4, 1962 S. SCHWARTZ Re. 25,234

PACKING MEANS FOR PILE FABRICS

Original Filed June 1, 1956 3 Sheets-Sheet 2

INVENTOR.
SOL SCHWARTZ
BY
Zoltan Polachek
ATTORNEY

PACKING MEANS FOR PILE FABRICS

Original Filed June 1, 1956 3 Sheets-Sheet 3

INVENTOR.
SOL SCHWARTZ
BY
ATTORNEY

United States Patent Office

Re. 25,234
Reissued Sept. 4, 1962

25,234

PACKING MEANS FOR PILE FABRICS

Sol Schwartz, 67—40 173rd St., Flushing, N.Y.

Original No. 2,895,604, dated July 21, 1959, Ser. No. 588,672, June 1, 1956. Application for reissue July 20, 1961, Ser. No. 128,328
23 Claims. (Cl. 206—51)

Matter enclosed in heavy brackets [ ] appears in the original patent but forms no part of this reissue specification; matter printed in italics indicates the additions made by reissue.

This invention relates to new and useful improvements in packing, storing and shipping devices.

More particularly, the present invention proposes the construction of an improved supporting and clamping device for pile fabric and similar material which will hold the material in continuous accordion folds with the pile spaced apart and protected by the backing of the material.

As a further object, the present invention proposes forming the packing and shipping device with spaced material holding members and spaced material receiving openings so that material can quickly and easily be packed and stored in packing crates or cases.

Another object of the invention proposes constructing the material supporting and clamping devices with perforated lugs so that stiffly flexible wire or other threading elements can extend through the perforated lugs and fabric therebetween to hold the fabric taut and closely spaced.

It is also proposed to provide material supporting and clamping devices arranged in crisscrossed manner so as to display the fabric in a more attractive and orderly fashion.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figures 1, 2:
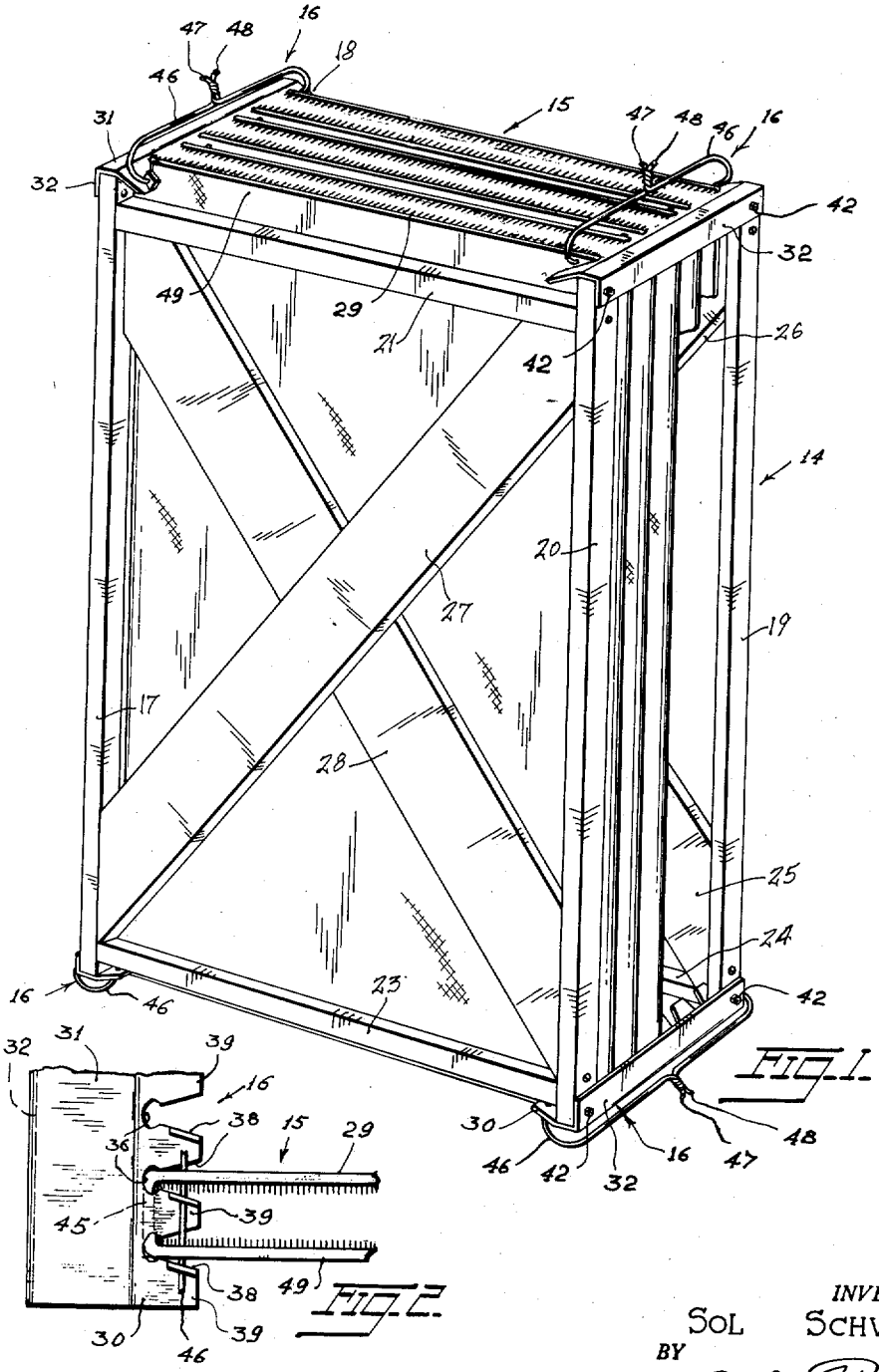
FIG. 1 is a perspective view of a packing crate with packing and shipping devices constructed and arranged in accordance with the present invention, supporting pile fabric therein.
FIG. 2 is a fragmentary top plan view of one of the packing and shipping devices, with supported pile fabric therein.

Referring to the drawings in detail, in FIG. 1 a packing crate or case is shown and indicated generally at 14, which crate is used for packing, storing and shipping fabric material, such as pile fabric 15, or similar material, in an orderly fashion and protected from harm to its napped surface. The fabric is clamped between upper and lower supporting and clamping devices indicated generally at 16 embodying one form of the present invention.

The crate 14 is rectangular in configuration and cross section and comprises a frame having corner posts 17, 18, 19 and 20, side bars 21 connecting the top ends of the corner posts, only one side bar being shown, and side bars 23 and 24 connecting the bottom ends of the corner posts. The frame is reinforced and made steady at one side thereof by crossed flat boards 25 and 26 extending between the top and bottom side bars, diagonally, from corner to corner thereof, and by similarly arranged crossed flat boards 27 and 28 on the other side thereof.

Figures 3, 4, 5, 6, 7, 8:
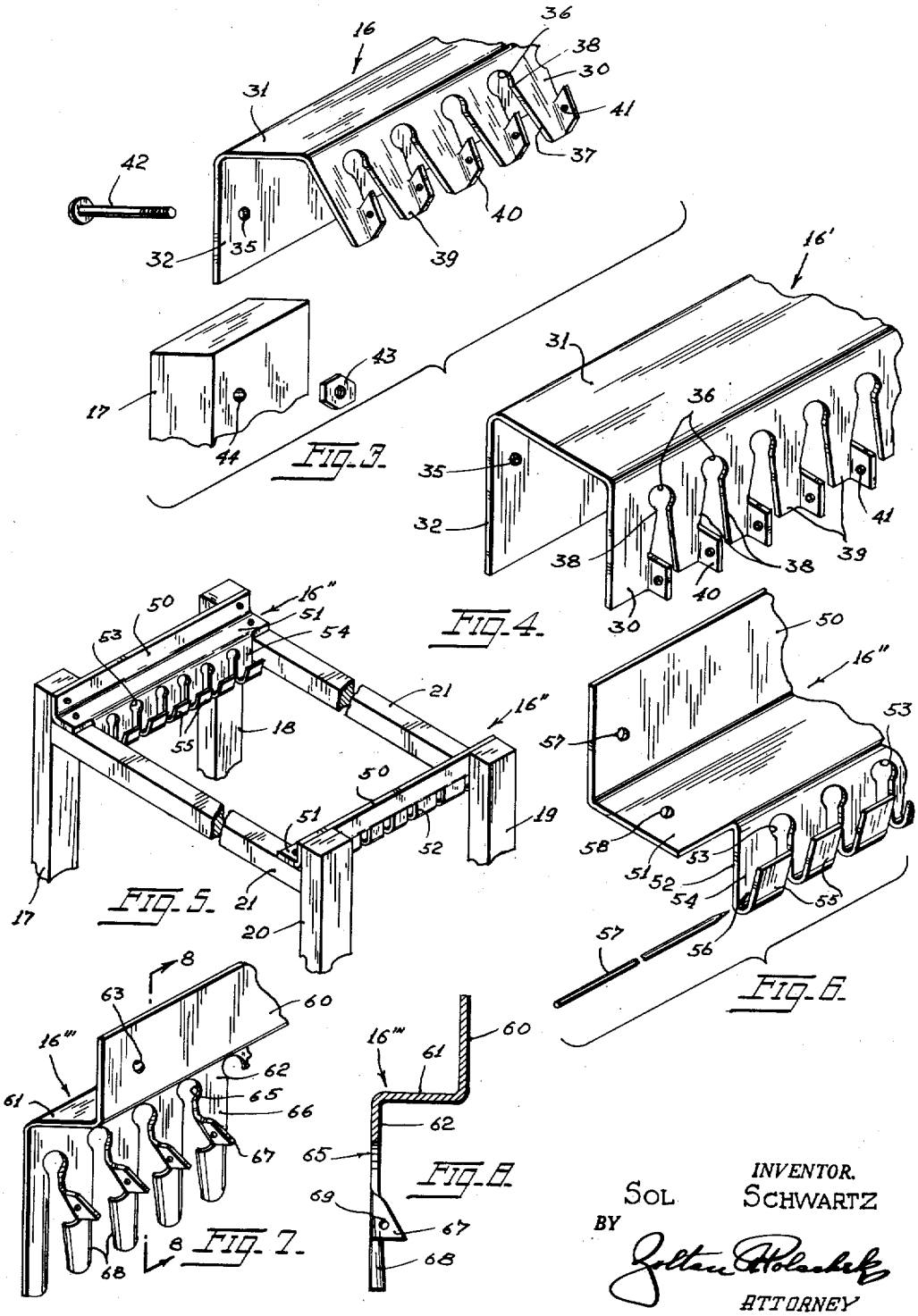
FIG. 3 is a perspective exploded view of a portion of a corner of the structure shown in FIG. 1.
FIG. 4 is a fragmentary perspective view of the supporting and clamping device of FIG. 3, bent to channel shape.
FIG. 5 is a perspective view of a packing crate embodying a modification of the invention, on a reduced scale.
FIG. 6 is an enlarged fragmentary perspective view of the supporting and clamping device of FIG. 5, showing a fastening element in position preparatory to insertion therein.
FIG. 7 is a similar view showing a still further modified form of supporting and clamping device.
FIG. 8 is a vertical sectional view taken on the plane of the line 8—8 of FIG. 7.

The pile fabric 15 is folded longitudinally in accordion fashion, forming rectangular panels 29 which extend from top to bottom of the crate and from one end to the other. The panels are clamped at their top and bottom corners by supporting and clamping devices 16 embodying one form of the invention as shown in FIG. 1. As shown in FIG. 3, each device 16 comprises a substantially channel-shaped body with one leg 30 thereof slanting at an oblique angle to the plane of the body of the bight portion 31 thereof. The other leg portion 32 is disposed at right angles to the bight portion. The leg portion 30 may, however, be disposed at right angles to the bight portion thereby forming a truly U-shaped or channel-shaped device as shown in the modified supporting and clamping device 16' in FIG. 4.

The leg portion 32 has bolt holes 35 adjacent its ends. Hanger leg portion 30 is formed with a plurality of spaced keyhole slots 36 intercepting the end edge thereof, the long edge walls 37 of the slot slanting outwardly from the round closed end thereof thereby providing a neck portion 38 and thereby forming V-shaped slots and forming substantially triangular shaped spring fingers 39. At the outer end of one long edge wall 37 of each slot 36, the material of the device is bent at right angles to the plane of the leg portion thereby forming a radial lug 40 substantially square in configuration. Each lug is formed with a central hole 41.

The clamping devices are secured to the top and bottom ends of the frame by means of bolts 42 and nuts 43, the bolt passing through holes 35 in the leg portions 32 and through registering holes 44 in the ends of the corner posts.

At the top of the frame, the devices 16 are mounted with their bight portions 31 seated on the top edges of the posts, and with the attaching leg portions 32 on the outside surfaces of the posts so that the hanger legs 30 are disposed inwardly and downwardly in opposed relation. At the bottom of the frame, the clamping devices are positioned on the posts so that their hanger legs 30 extend inwardly and upwardly, in opposed relation.

In use, the material of the pile fabric 15 is folded lengthwise from top to bottom into the rectangular-shaped panels 29 with the bight portions 45 of the folds slid under the spring fingers 39 and the upper corners of the pile panels inserted through the neck portions 38 into the round portions of the keyhole slots 36 so that the bight portions of the folds extend across the bases of the fingers 39 between the round portions of the slots, as best shown in FIG. 2. When thus inserted, the panels are disposed in closely spaced relation across the width of the crate. Flexible fastening elements such as wires 46 are threaded through the material of the spaced panels and through the holes 41 in the registered lugs 40 and their ends 47 and 48 twisted together thereby securing the pile fabric 15 in the devices 16. The panels 29 of the pile fabric are thus held closely spaced but with the napped surfaces thereof disposed face to face but spaced from and out of contact with each other, and with the backing portions 49 thereof disposed on the outside of the folds.

In FIGS. 5 and 6, a modified form of supporting and clamping device 16'' is illustrated. This form of device comprises an L-shaped body having a vertically disposed leg portion 50 and a horizontally disposed leg portion 51. An integral flange portion 52 depends from the edge of the horizontal leg portion. The flange portion 52 is formed with spaced keyhole slots 53 similar in shape to the keyhole slots 36 of the form of FIGS. 1 to 4, inclusive, forming fingers 54. In this form, however, the fingers 54 are bent upwardly as indicated at 55 thereby forming a trough 56 at the bottom of the flange portion. Holes 57 and 58 in the vertical and horizontal leg portions 50 and 51, respectively, receive fastening elements for securing the devices to the tops and bottoms of the posts 17, 18, 19 and 20, and the adjacent ends of the top bars 21 and bottom bars 23 and 24 of the frame.

The pile fabric 15 is received in the keyhole slots 53 in a manner similar to the first form of supporting and clamping devices, but in this form a pointed rod or elongated pin 57 is inserted through the material of the panels 29 of the fabric at the trough 56, the rod or pin seating in the trough for fastening the pile fabric to the devices 16''.

Another modified form of supporting and clamping device 16''' is shown in FIGS. 7 and 8 wherein the body portion thereof is L-shaped with a vertical leg portion 60 and a horizontal leg portion 61, and with a flanged portion 62 depending from the horizontal leg portion. Holes 63 are formed in the vertical leg portion for receiving fastening elements for fastening the device to the ends of posts of the frame. The depending flange portion is formed with spaced keyhole slots 65 with the edges of the slots slanting away from each other thereby forming fingers 66. One slanting wall of each finger is bent at an oblique angle to the plane of the body of the flange at its inner end adjacent the round portion of the keyhole slot thereby forming a lug 67, and said slanting wall at its outer end is curved slightly as indicated at 68. The flange portion 62 is longer than either of the leg portions 60 and 61.

The pile fabric 15 is folded and inserted into and through the keyhole slots 65, the curved ends 68 of the fingers 66 facilitating such insertion and preventing damage to the fabric. When the folds of the fabric are positioned in the slots 65, a wire such as the wire 46 of the form of device 16 shown in FIG. 1 or the rod or wire 57 of the form of FIGS. 5 and 6 may be inserted through the material of the folds and through holes 69 formed in the lugs 67 for securing the pile fabric to the device 16'''.

Figure 9:
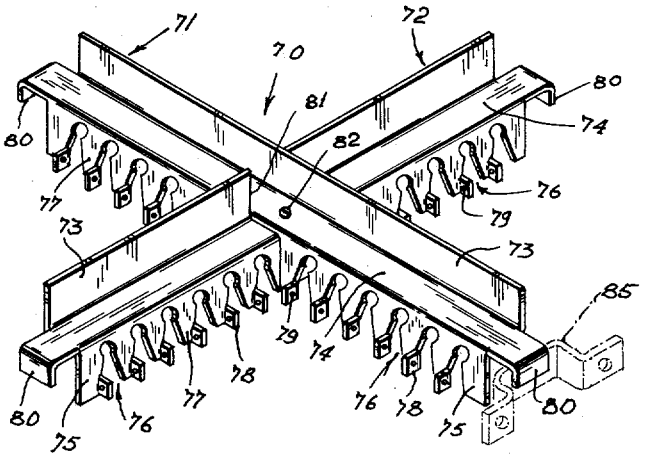
FIG. 9 is a perspective view of yet another modified form of supporting and clamping device showing a supporting bracket in dotted lines.
Figure 10:
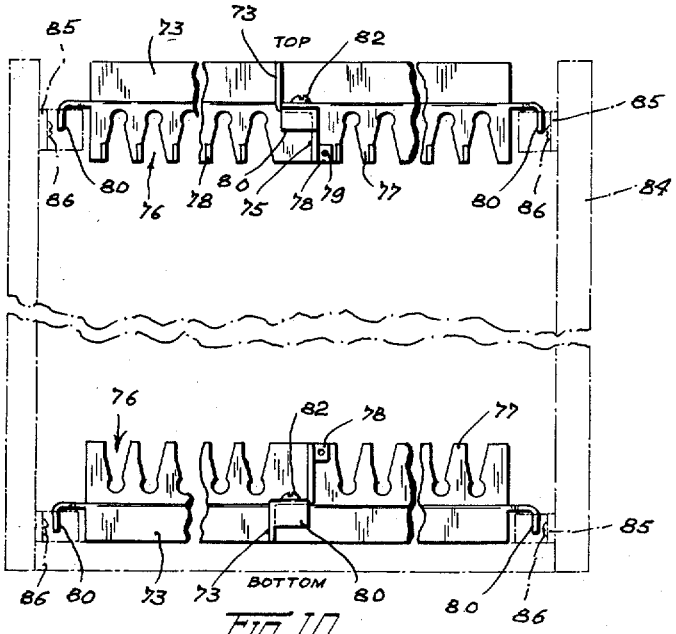
FIG. 10 is a phantom elevational plan view of a packing crate showing supporting and clamping devices of the form of FIG. 9 in position therein.

In FIGS. 9 and 10, there is illustrated an assembly of supporting and clamping devices indicated generally at 70. The assembly comprises two supporting and clamping devices indicated generally at 71 and 72 arranged in crisscross fashion. Each of said devices 71 and 72 is similar in construction and consists of a vertical leg portion 73 and a horizontal leg portion 74. A depending flange portion 75 is formed on the free edge of the horizontal leg portion. The flange portion 75 is formed with a series of spaced keyhole slots 76 having their edge walls slanting outwardly forming substantially triangular-shaped fingers 77. The material of each finger is bent outwardly along one slanting edge wall thereof forming a lug 78 thereon, each lug being formed with a central hole 79. The horizontal leg portion 74 of each device extends beyond its adjacent vertical leg portion 73 and is bent downwardly at each end forming an end flange 80. The vertical leg portion 73 of the device 72 is slotted midway its ends as indicated at 81 to permit passage of the vertical and leg portions of the device 71. The devices 71 and 72 are secured in crisscross fashion by a screw 82 passing through registered openings in the overlapped horizontal leg portions of the devices.

This assembly may be used with a crate 84 of square or round cross section and is adapted to be removably mounted in the top and bottom thereof by hooking the flanges 80 over straps 85 in the form of brackets secured to the inner surface of the crate by screws 86.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A packing, storing and shipping crate comprising a framework, pile fabric supporting and clamping devices secured in spaced relationship thereon, each device including a slotted wall portion, the slotted wall portions being arranged so as to receive confronting layers of the fabric with the layers space from each other, and means for securing the confronting layers to the device, said securing means including wire receiving passages in spaced alignment on said slotted wall portions, wire means extending through said passages and through the layers of the supported fabric.

2. A packing, storing and shipping crate comprising a rectangular-shaped open framework, fabric supporting and clamping devices at the top and bottom thereof at the ends thereof, each device including a leg portion secured to the framework, and a leg portion formed with spaced keyhole slots, said slotted leg portions being arranged on the framework to receive folded portions of a fabric, perforated lugs projecting outwardy of the slotted leg portion in alignment, and wire means extending through the folded portions of a supported fabric and through the perforations in said lugs for securing the fabric to the device.

3. A packing, storing and shipping crate comprising rectangular-shaped open framework, fabric supporting and clamping devices at the top and bottom thereof at the ends thereof, each device including a leg portion secured to the framework, and a leg portion formed with spaced keyhole slots forming finger portions therebetween, said slotted leg portions being arranged on the framework so as to receive folded portions of the fabric, and means for securing the folded portions of the pile fabric to the finger portions, said finger portions having aligned perforated portions, said securing means including wires extending through the perforated portions of the finger portions and through and between the folds of the folded pile fabric.

4. A packing, storing and shipping crate comprising a rectangular frame with corner posts, bars connecting the posts at the top and bottom at the sides of the frame, transverse fabric supporting and clamping devices connecting the posts at the ends of the frame, each device having a substantially channel-shaped body seated on the ends of the posts, the bight portion of the device seating on the extreme end surface of the posts, one leg portion of the device being secured to the outer surfaces of the posts, the other leg portion of the device being slotted and disposed over the inner surfaces of the posts, said slotted leg portions being arranged so as to receive the folds of a folded pile fabric therebetween, and means for securing the folds of the fabric to the devices.

5. A packing, storing and shipping crate comprising a rectangular frame with corner posts, bar connecting the posts at the top and bottom at the sides of the frame, transverse fabric supporting and clamping devices connecting the posts at the ends of the frame, each device having a substantially channel-shaped body seated on the ends of the posts, the bight portion of the device seating on the extreme end surface of the posts, one leg portion on the device being secured to the outer surfaces of the posts, the other leg portion of the device being slotted and disposed over the inner surfaces of the posts, said slotted leg portions being arranged so as to receive the folds of a folded pile fabric therebetween, and means for securing the folds of the fabric to the devices, said securing means constituting wire means passing through the folds of the fabric.

6. A packing, storing and shipping crate comprising a rectangular frame with corner posts, bars connecting the posts at the top and bottom at the sides of the frame, transverse fabric supporting and clamping devices connecting the posts at the ends of the frame, each device having a substantially channel-shaped body seated on the ends of the posts, the bight portion of the device seating on the extreme end surfaces of the posts, one leg portion of the device being secured to the outer surfaces of the posts, the other leg portion of the device being slotted and disposed over the inner surfaces of the posts, said slots forming finger portions, perforated lugs extending outwardly of the finger portions, said slotted leg portions being arranged so as to receive the folds of a folded pile fabric in the slots thereof, and means for securing the folds of the fabric to the finger portions, said means including a wire passing through the folds of the folded fabric and through the perforations in the lugs on said finger portions.

7. A packing, storing and shipping crate comprising a rectangular frame with corner posts, bars connecting the posts at the top and bottom at the sides of the frame, transverse fabric supporting and clamping devices connecting the posts at the ends of the frame, each device having an L-shaped body with vertical and horizontal leg portions, a flange depending from the free end edge of the horizontal leg portion, said flange having spaced keyhole slots therein forming fingers therebetween, said fingers having bent-up ends forming a trough along the bottom of the flange, said flanges being arranged so as to receive the folds of a folded pile fabric between the slots thereof, and a pointed wire member passing through the material of the folds of the fabric and being seated in said trough for holding the fabric on the device.

8. A packing, storing and shipping crate comprising a rectangular frame with corner posts, bars connecting the posts at the top and bottom at the sides of the frame, transverse fabric supporting and clamping devices connecting the posts, at the ends of the frame, each device having an L-shaped body with vertical and horizontal leg portions, a flange depending from the free end edge of the horizontal leg portion, said flange having spaced keyhole slots therein forming fingers therebetween, perforated lugs on the fingers disposed at an oblique angle to the plane of the fingers, said flanges being arranged so as to receive the folds of a folded pile fabric in the slots thereof, and wire means passing through the material of the folds of the fabric and through the perforations in said lugs for securing the pile fabric to the device.

9. A packing, storing and shipping crate comprising a rectangular frame with corner posts, bars connecting the posts at the top and bottom at the sides of the frame, transverse fabric supporting and clamping devices connecting the posts, at the ends of the frame, each device having an L-shaped body with vertical and horizontal leg portions, a flange depending from the free end edge of the horizontal leg portion, said flange having spaced keyhole slots therein forming fingers therebetween, perforated lugs on the fingers disposed at an oblique angle to the plane of the fingers, said flanges being arranged so as to receive folds of a folded pile fabric in the slots thereof, and wire means passing through the material of the folds of the fabric and through the perforations in said lugs for securing the pile fabric to the device, one edge wall of each finger being curved at its bottom end to facilitate entry of the folds of the fabric into the slots.

10. A packing, storing and shipping crate comprising a tubular body with opposed brackets on its inner surface, an assembly of devices at each end thereof for supporting and clamping a pile fabric, each assembly including a pair of L-shaped bodies arranged in crisscrossed fashion, one L-shaped body overlapping the other L-shaped body, each L-shaped body including vertical and horizontal leg portions, and a flange depending from the horizontal leg portion, the vertical leg portion of one L-shaped body being slotted to receive the leg portions of the other L-shaped body, each flange being formed with spaced keyhole slots to receive the folds of a folded pile fabric, perforated lugs on the flanges for receiving a fastening element for fastening the fabric to the device, the ends of the horizontal leg portion being bent downwardly to interlock with the brackets on the inner surface of the crate.

11. In a packing, storing and shipping crate, a device for supporting and clamping one end of a pile fabric to the crate with the folds thereof in spaced relation, said device comprising a channel-shaped body having one parallel leg portion thereof slotted to receive the folds of one end of a pile fabric, and perforated lugs formed on the said leg portion along the outer end of the slots for receiving a fastening element for fastening the fabric to the device.

12. In a packing, storing and shipping crate, a device for supporting and clamping one end of a pile fabric to the crate with the folds thereof in spaced relation, said device comprising an L-shaped body including vertical and horizontal leg portions, a flange depending from the free end edge of the horizontal portion, said flange having spaced slots therein forming fingers therebetween, said fingers having bent up ends forming a trough to receive a fastening element for holding the fabric on the device.

13. In a packing, storing and shipping crate, a device for supporting and clamping one end of a pile fabric to the crate with the folds thereof in spaced relation, said device comprising an L-shaped body including vertical and horizontal leg portions, a flange depending from the free end edge of the horizontal portion, said flange having spaced keyhole slots therein forming fingers therebetween, said fingers having perforated lugs thereon bent at an oblique angle thereto for receiving a fastening element through the perforations thereof, to hold the fabric on the device, said fingers also having curved end edges to facilitate entry of the folds of the material therethrough.

14. In a packing, storing and shipping crate, an assembly of devices for supporting and clamping a pile fabric therein, said assembly including a pair of L-shaped bodies arranged in crisscrossed fashion, one L-shaped body overlapping the other L-shaped body, each L-shaped body including vertical and horizontal leg portions, and a flange depending from the horizontal leg portion, the vertical leg portion of one L-shaped body being slotted to receive the leg portions of the other L-shaped body, each flange being formed with spaced keyhole slots to receive the folds of a folded pile fabric, perforated lugs on the flanges for receiving a fastening element for fastening the fabric to the device, the ends of the horizontal leg portion being bent downwardly to interlock with portions of the crate.

15. Packing for securing and supporting a length of pile fabric wound to form spaced confronting layers and comprising a frame made up of opposed end heads spaced apart the width of the fabric, means securing said end heads rigidly spaced apart in such opposed relation, said end heads having supporting fingers about which successive fabric layers may be extended and spaced apart a distance to hold each individual layer spaced rom adjacent layers and said spaced fingers having ligned passages disposed at opposite sides of the spaces etween said fingers and a cloth piercing member exending through said passages across the intervening paces between the supporting fingers in position to ierce the individual fabric layers disposed in the spaces etween the fingers to thereby secure individual layers of he fabric in spaced apart relation.

*16. A device for supporting layers of fabric from one nother, comprising*

*a body having a plurality of spaced means,*

*each of said spaced means comprising sheet material having spaced apart slots therein,*

*said slots extending from an outermost part of said sheet material to a region inwardly of said part,*

*the walls of said slots being located so that corresponding slots in each of said spaced means are aligned, whereby said walls are spaced to receive an edge of said fabric therebetween, and*

*each of said spaced means including a plurality of aligned openings extending generally in a direction which is at an angle to the surface of said walls.*

*17. A device in accordance with claim 16 in which the abric is held between the walls of aligned slots and in hich a thin elongated retaining element passes through aid fabric and through the aligned openings.*

*18. A device in accordance with claim 16, wherein aid spaced means comprises two arms arranged in spaced arallel relation whereby successive layers of fabric may e wound back and forth between the arms and around ach of the elements on alternate arms successively.*

*19. A device in accordance with claim 18 wherein said ody comprises a shipping crate on which the two arms re mounted at opposite sides thereof.*

*20. A device in accordance with claim 16, wherein said paced means comprise at least three outwardly extending arms arranged substantially in a single plane and projecting at an angle to each other whereby the fabric may e wound spirally around successive elements on the arms space the layers of fabric radially.*

*21. A device for supporting layers of fabric from one nother, comprising*

*a body having a plurality of spaced means,*

*each of said spaced means having spaced apart slots therein,*

*the walls of said slots being located so that corresponding slots in each of said spaced means are aligned, whereby said walls are spaced to receive an edge of said fabric therebetween,*

*each of said spaced means including a plurality of aligned openings extending generally in a direction which is at an angle to the surface of said walls, and*

*said spaced means extending radially from a common region.*

*22. A device in accordance with claim 21 in which said spaced means extend radially at substantially equal angles therebetween.*

*23. A device for supporting layers of fabric from one another, comprising*

*a body having a plurality of spaced means,*

*each of said spaced means comprising elongated material having spaced apart slots formed therein,*

*said elongated material having front and back surfaces which are substantially continuous except for said slots,*

*said slots extending from an outermost part of said material laterally inwardly of said material and terminating within said material, said material thereby bounding each slot except at the open end in said outermost part,*

*the walls of said slots being located so that corresponding slots in each of said spaced means are aligned, whereby said walls are spaced to receive an edge of said fabric therebetween,*

*each of said spaced means including a plurality of aligned openings extending generally in a direction which is at an angle to the surface of said walls.*

References Cited in the file of this patent or the original patent

UNITED STATES PATENTS

| | | |
|---|---|---|
| 499,774 | Bancroft | June 20, 1893 |
| 523,528 | Hox | July 24, 1894 |
| 1,344,110 | Banes | June 22, 1920 |
| 2,025,138 | Waite | Dec. 24, 1935 |
| 2,178,113 | Dailey | Oct. 31, 1939 |
| 2,315,532 | Lucia et al. | Apr. 6, 1943 |
| 2,524,958 | Calvani | Oct. 10, 1950 |

FOREIGN PATENTS

| | | |
|---|---|---|
| 103,477 | Austria | June 10, 1926 |